Patented Feb. 2, 1937

2,069,273

UNITED STATES PATENT OFFICE 2,069,273

NONSLUDGING OIL

Raphael Rosen, Cranford, N. J., assignor to Standard Oil Development Company, a corporation of Delaware No Drawing. Application December 30, 1933, Serial No. 704,763

10 Claims. (Cl. 87—9)

The present invention relates to lubricating oils and to a process of making the same and in particular to oils of low sludging characteristics especially adapted to high temperature service. The invention will be fully understood from the following description.

Sludge formation is particularly objectionable in oils used for high temperature lubrication, for example, in the lubrication of automotive engines. The causes of sludging are not clearly understood but it appears to bear some relation to the oxidation characteristics of the oil and to be aggravated by the presence of moisture. Sludge formation appears to be some form of polymerization or agglomeration of materials which have a low ratio of hydrogen to carbon and when these materials reach a sufficient degree of polymerization or agglomeration they become totally insoluble in the lubricating oil from which they are produced. They thereupon separate and deposit on the valves, rings, grooves, underface of piston and in the crankcase of the engine. It has been noted that many highly refined oils show a high oxidation rate and while this is not clearly understood it is believed that the refining treatment has removed oxidation inhibitors on the one hand and in same manner eliminated the natural agents which have sludge dispersing powers.

It has been found that sludge formation can be reduced considerably by the addition of certain dispersing agents. Just what action these materials have is obscure but it seems clear that the sludging tendency of the oil can be greatly reduced as measured either in actual operation in the engine or by the Sligh numbers of the oils. As indicated above the action of these materials is obscure but it is believed that the action is perhaps two-fold, reducing the degree of agglomeration or polymerization, and maintaining the materials which have agglomerated in a stable suspended form so that the deposition does not occur in the engine.

The substances having sludge dispersing properties are hydrocarbon oils which are, in the first place, of the highest boiling range readily obtainable, that is to say, they are markedly heavier than the oils ordinarily used for motor lubricants. They should preferably be oils sufficiently heavy so that they are substantially undistillable and are obtained as residuals. They should likewise be of a strongly paraffinic nature; that is to say, with a ratio of hydrogen to carbon corresponding as closely as possible to the paraffin series of hydrocarbons but they should be free-flowing liquids. Heavy cuts of naturally occurring oils for example of bright stocks cylinder oils or their extraction products and the like possess sludge dispersing powers to a noticeable degree but it is feeble at best and such large quantities are required that these substances are impractical, for example, 20 to 30% or even as much as 50% are required to give a result comparable with that produced by as little as 1% of the synthetic oils which will be disclosed below.

The sludge dispersers which are preferred are those which may be produced synthetically. The physical characteristics of these materials are similar to the heavy naturally occurring paraffinic residuals except that these are generally of higher molecular weight, may be used in small quantities and for these reasons are preferable. Among them may be mentioned condensation or polymerization products of low volatility fractions of paraffin or mixed base crude oils, for example, paraffin oils or waxes which have been rendered unsaturated by cracking or some other means and then condensed by means of aluminum chloride or other equivalent catalyst. The cracking should not be so drastic as to produce large amounts of gasoline but only sufficient to produce a highly unsaturated heavy fraction. The cracked materials may be condensed alone or they may be condensed with cyclic hydrocarbons such as benzol or naphthalene or their hydrogenated derivatives which are used in relatively small quantities to form condensation nuclei. It is also possible to condense such materials by the action of high voltage, high frequency alternating electric discharges.

In making these materials it is preferable to select the heaviest naturally occurring oils or waxes and it is found that petrolatum, for example, is more suitable as a starting material than paraffin wax. It will be understood that these dispersers may be produced by the action of chloriated oils or waxes instead of cracked waxes, or by means of the chlorinated and subsequently dechlorinated materials. These latter materials are more effective than the naturally occurring oils and are ordinarily useful in proportions of 1 to 2% although they should not be used in substantially larger quantities because for some unknown reason too much of the dispersers may be used and there is a definite optimum quantity. The amount is preferably always below 5%. Not only are these oils more effective than the heavy naturally occurring oils but are also preferable because, when used in the small quantities indicated they do not appreciably affect the other properties of the motor oils to which they are added, for example when used in the optimum quantities the viscosity need not be raised more than 2 to 5 sec. Saybolt at 210° F.

Some of the above substances, notably those produced by condensation of waxy hydrocarbons alone or with aromatics at low temperature by means of aluminum chloride or by high voltage condensation, are pour inhibitors but this action is not necessary to their desirable sludge dispersing properties and they may be used very effectively in natural petroleum oils or hydrogenated oils both of which have been dewaxed or in oils of the type which contain no natural wax. Furthermore, materials made under conditions, for example, at elevated temperatures, as to have no pour inhibiting properties, or which are treated so as to destroy those properties, still show excellent sludge dispersing characteristics.

The sludge dispersing agents which have been disclosed above are especially desirable when used in combination with oxidation inhibitors. These latter materials are wellknown in the art and are useful alone but it has been found that they almost invariably increase the Sligh number of the oil to which they are added. This defect is entirely corrected by the addition of a sludge disperser in combination with the oxidation inhibitor so as to produce stable oils of low Sligh number and low sludging characteristics. Any of the known oxidation inhibitors may be used and among these are mentioned the phenolic compounds, especially the cresols, di- and tri-hydroxy phenols and cresols, especially resorcinol, hydroquinone and pyrogallol. The naphthols, such as alphanaphthol and its alkylated derivatives are likewise useful. Also aromatic di-sulphids, polysulphids and mercaptans are very satisfactory. Inhibitors containing hydroxyl, amino, di-sulphide and polysulphide groups attached to an aromatic nucleus to which is also attached stabilizer groups such as oxygen or sulphur as an ether are particularly desirable. These substances are mentioned merely as examples of a large and wellknown class, any of which may be used in the present compositions in conjunction with sludge dispersers of the class mentioned above.

The following examples of oils made in accordance with the present invention will illustrate the composition and the action of these materials.

*Example I*

A dewaxed motor oil, S. A. E. grade 20 having a Saybolt viscosity of 58 sec. at 210° F. was found to give a Sligh number of 25.7 and 22.5 in two tests carried out in accordance with the procedure described in Prod. Am. Soc. for Testing Materials 24,964, II (1924) with the exception that the heating period was continued for 24 hours. A sludge disperser was produced by chlorinating a 160° F. melting point petrolatum to the extent of about 12% Cl by weight and condensing the same with about 10% of naphthalene at 80 to 100° F. using aluminum chloride. When 1% of this is added to the oil the Sligh number is reduced to 9.3, using the same procedure as before. The viscosity of the blend was 60.5 sec. Saybolt at 210° F.

*Example II*

A sludge disperser made by condensation of 160° F. M. P. petrolatum is added in proportion of 1% to an S. A. E. 30 grade oil which is free from wax and it is found that the Sligh number (24 hrs.) is reduced, from 18.3 to 17.5 (average 17.9), to 1.9 and the viscosity is only raised about 2 sec. at 210° F.

*Example III*

To a dewaxed heavy filtered spindle oil S. A. E. 20 which had been dewaxed, and which had a 2½ hour Sligh number of 16.5 is added 5% of a condensation product made from a 156° F. M. P. petrolatum. The oil was then found to have 1.4 Sligh number in both 2½ and 24 hour tests.

*Example IV*

To the oil used in Example III is added 5% of a disperser made by condensation of water white petrolatum, M. P. 156° F. This material reduced the 24 hour Sligh number to 4.3.

*Example V*

A motor oil, S. A. E. 20, was used as a blank in the following tests and in comparison, as a disperser is added 1% and 10% separately of a condensation product produced from 100 parts of naphtha obtained by cracking gas oil in vapor phase at temperature between about 1000 and 1100° F. at pressure below 100 pounds per sq. in. mixed with 30 parts benzol. The condensation is brought about with 3.5 parts of aluminum chloride.

|  | 24 hr. Sligh | Vis. @ 100° F. | Vis. @ 210° F. |
|---|---|---|---|
| Blank | 31.0 | 413 | 58 |
| Blank +1% disperser | 1.0 | 444.5 | 60.5 |
| Blank +10% | 17.0 | 900.0 | 97.5 |

It will be observed that the 10% disperser made a great change in viscosity and while it reduced the Sligh number somewhat, it was not nearly so great as when used in concentration of 1%.

*Example VI*

To the base oil used in Example V is added 1% of a wax condensate produced by passage of high voltage electric current thru the wax. This reduced the Sligh number (24 hrs.) to 18.

*Example VII*

To a turbine oil with a tendency to form sludge during oxidation, is added one per cent of a disperser similar to that used in Example I. The oxidation characteristics as indicated by acid and sludge formation in the unblended sample and the same containing 1% of the disperser, while samples are blown with air as indicated, are as follows:

*Life test at 300° F. with 10 cu. ft. air per hour*

|  | Acidity mg. KOH/gm. oil after | | | | Sludge mg/10 gm. oil after 75 hrs. |
|---|---|---|---|---|---|
|  | 3 hrs. | 5 hrs. | 24 hrs. | 75 hrs. |  |
| Original turbine oil | 0.2 | 0.2 | 8.8 | 11.3 | 34.4 |
| Turbine oil with 1% disperser | 0.2 | 0.2 | 0.6 | 5.4 | 1.7 |

While the present invention is mainly directed to oils for automotive engine lubrication, it is to be understood that it is not limited entirely to this field, since the invention is useful in various other fields, for example, in turbine oils as well as cable or other insulating compounds.

The present invention is not limited to any theory of the action either of the sludge dispersers or of the oxidation inhibitors, nor to any particular members of either class, but only to the following claims in which it is desired to claim all novelty inherent in the invention.

I claim:

1. An oil of low sludging tendency, comprising a wax-free petroleum lubricating oil with a sludge dispersion agent which comprises a heavy fluid synthetic hydrocarbon of high ratio of hydrogen to carbon.

2. Product according to claim 1 in which the dispersion agent is a heavy, substantially undistillable, fluid hydrocarbon with a ratio of hydrogen to carbon closely approaching that of the paraffin series.

3. Composition according to claim 1 in which the sludge dispersion agent comprises a heavy fluid hydrocarbon prepared by condensation of low volatility fractions of paraffinic petroleum.

4. Composition according to claim 1 in which the sludge dispersion agent comprises a heavy fluid hydrocarbon polymer produced from petrolatum.

5. An improved lubricant comprising a dewaxed hydrocarbon lubricating oil and a sludge dispersion agent comprising a fluid synthetic hydrocarbon prepared by condensation of waxy hydrocarbons.

6. Lubricant according to claim 5 in which the dispersion agent is prepared by low temperature aluminum chloride condensation of waxy hydrocarbons.

7. Lubricant according to claim 5 in which the dispersion agent is prepared by electrical condensation of waxy hydrocarbons.

8. Lubricant according to claim 5 in which the dispersion agent is prepared by condensation of waxy hydrocarbons with aromatic hydrocarbons.

9. An oil of low sludging tendency comprising a wax-free petroleum lubricating oil and less than 5% of a sludge dispersion agent prepared by condensation of chlorinated petrolatum.

10. An oil of low sludging tendency comprising a wax-free petroleum lubricating oil and between 1 and 2% of a sludge dispersion agent prepared by condensation of chlorinated petrolatum with naphthalene.

RAPHAEL ROSEN.